United States Patent
Park et al.

(10) Patent No.: US 7,933,116 B2
(45) Date of Patent: Apr. 26, 2011

(54) PORTABLE TERMINAL HAVING HARD DISK

(75) Inventors: Hong-Joon Park, Gumi-si (KR); Kwang-Jin Bae, Gumi-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 725 days.

(21) Appl. No.: 11/875,114

(22) Filed: Oct. 19, 2007

(65) Prior Publication Data

US 2008/0119219 A1    May 22, 2008

(30) Foreign Application Priority Data

Nov. 16, 2006    (KR) ................. 10-2006-0113291

(51) Int. Cl.
*G06F 1/16*    (2006.01)

(52) U.S. Cl. ......... 361/679.33; 361/679.37; 361/679.31; 455/550.1; 455/575.1

(58) Field of Classification Search ............... 455/575.1, 455/550.1; 361/679.31–679.4, 679.55–679.59, 361/724–727; 439/96–100, 123
See application file for complete search history.

(56) References Cited

U.S. PATENT DOCUMENTS

| 7,643,244 | B1 * | 1/2010 | Money ................. 360/97.02 |
| 2004/0130866 | A1 * | 7/2004 | Itakura et al. ............. 361/685 |
| 2005/0201048 | A1 * | 9/2005 | Lai et al. ................. 361/683 |

FOREIGN PATENT DOCUMENTS

| CN | 1499919 A | 5/2004 |
| CN | 2682489 Y | 3/2005 |
| KR | 10-2006-0022416 A | 3/2006 |

* cited by examiner

*Primary Examiner* — Nguyen Vo
*Assistant Examiner* — Golam Sorowar
(74) *Attorney, Agent, or Firm* — Jefferson IP Law, LLP

(57) ABSTRACT

A portable terminal is provided. The terminal includes a hard disk, a housing having an opening formed thereon, and a motor protruding out of the hard disk while being received in the opening. Even when the space for receiving the hard disk is the same, the distance between the body of the hard disk and the inner peripheral surface of the housing of the terminal is sufficient to prevent external impact from directly acting on the hard disk. In addition, even if the distance between the body of the hard disk and the inner peripheral surface of the housing of the terminal remains the same, no extra space is unnecessarily occupied inside the housing because the motor of the hard disk is received in the opening. This has the merit of achieving compactness of the terminal.

5 Claims, 3 Drawing Sheets

PORTABLE TERMINAL HAVING HARD DISK

PRIORITY

This application claims the benefit under 35 U.S.C. §119 (a) to a Korean patent application filed with the Korean Intellectual Property Office on Nov. 16, 2006 and assigned Ser. No. 2006-113291, the entire disclosure of which is hereby incorporated by reference.

BACKGROUND OF THE INVENTION

1. Field of the Invention

The present invention relates to a portable terminal. More particularly the present invention relates to a portable terminal having a hard disk.

2. Description of the Related Art

Generally, the term "portable terminals" refers to devices which provide a wireless communication function between users or between a user and a service provider via a mobile communication base station, for example. The portable terminals provide users with various types of content such as mobile banking, watching TV, on-line games, and Video-on-Demand (VoD), as well as voice communication services and short message transmission.

Such portable terminals are classified according to their appearance into bar-type terminals having a single housing with communication circuits and inputting/outputting devices (e.g. a transmitter and a receiver) placed thereon, flip-type terminals having a flip cover installed on a bar-type housing, and folder-type terminals having a pair of housings adapted to rotate so as to be opened/closed and having inputting/outputting devices distributed on respective housings. Sliding-type terminals have recently appeared and have improved portability and user convenience together with folder-type terminals. As such, an effort to satisfy various tastes of users is ongoing.

Mobile communication services provided to portable terminals based on on-line connection have been diversified and now include items such as games, transmission of moving picture files, mobile banking, VoD, and Digital Multimedia Broadcasting (DMB). Such diversification of the mobile communication services is enabled by environments in which the portable terminals are widely used, user demands have been diversified, and various contents have been provided by using portable terminals.

Along with such diversified mobile communication services (e.g. DMB), demands for storing a large amount of information (e.g. MP3-type music files, moving picture files of various codec types, etc.) in the portable terminal have been increased.

Flash memories and hard disks have been used as information storage media. Although the flash memories are advantageously applied to portable terminals with the merit of compactness, high prices make it difficult to mount them as large-capacity memories. On the other hand, in the case of the hard disks, they are more disadvantageous for compactness of portable terminals than the flash memories. Despite that, since they can be mounted as large-capacity memories at advantageous prices, the hard disks have mainly been mounted on the portable terminals demanding a memory of at least 1 GB.

FIG. 1 is a sectional view of a conventional portable terminal 100 having a hard disk 102 installed. As shown in FIG. 1, the hard disk 102 is received in a housing 101 of the terminal 100 and has at least one surface screened from external environments by a shield member 119 so as to protect the hard disk 102 from external electromagnetic fields.

Conventional portable terminals equipped with a hard disk have a space of about 0.5 mm secured between the hard disk and the inner peripheral surface of the housing of the terminals so that, when an external impact acts on the portable terminals, the external impact is not transmitted to the hard disk. As shown in FIG. 1, in the space d4 having a height of about 5.75 mm, a hard disk 102 is installed so that one surface of a body 121 thereof and a motor 123 thereon have a distance d1, d2 of about 0.5 mm from the inner peripheral surface of the housing 101 of the terminal 100 and the shield member 119, respectively. The motor 123 protrudes about 1.06 mm from the other surface of the body 121 of the hard disk. The motor 123 of such a height d3 occupies an unnecessarily large space between the other surface of the body 121 of the hard disk and the shield member 119 in which other components may otherwise be installed.

Therefore, the fact that the motor of the hard disk occupies such an unnecessarily large space adversely affects the compactness of the terminal, to say nothing of mounting the hard disk itself.

In addition, since sufficient space fails to be secured between one surface of the body of the hard disk and the inner peripheral surface of the housing or between the motor and the shield member, there is concern that an external impact may directly act on the hard disk.

SUMMARY OF THE INVENTION

An aspect of the present invention is to address the above-mentioned problems and/or disadvantages and to provide at least the advantages described below. Accordingly, an aspect of the present invention is to provide a portable terminal having a hard disk which improves the efficiency of utilization of the internal space of the terminal and which is advantageous for compactness.

Another aspect of the present invention is to provide a portable terminal having a sufficient space secured between the hard disk and structures of the terminal so as to prevent an external impact from directly acting on the hard disk.

In accordance with an aspect of the present invention, a portable terminal is provided. The terminal includes a hard disk, a housing having an opening formed in the housing, and a motor protruding from a body of the hard disk to be received in the opening.

BRIEF DESCRIPTION OF THE DRAWINGS

The above and other exemplary features, aspects, and advantages of certain exemplary embodiments of the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and configurations are omitted for clarity and conciseness.

Figure 1:
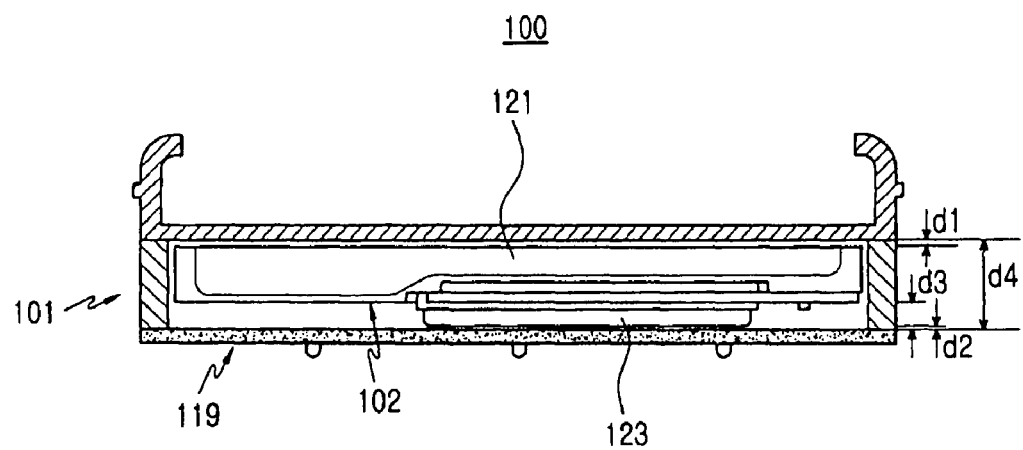
FIG. 1 is a sectional view of a conventional portable terminal having a hard disk installed thereon.
Figure 2:
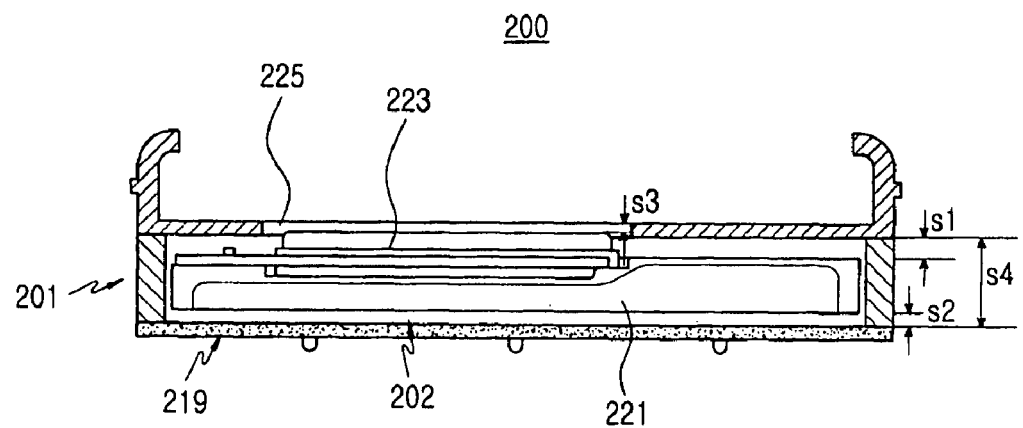
FIG. 2 is a sectional view of a portable terminal having a hard disk according to an exemplary embodiment of the present invention.
Figure 3:
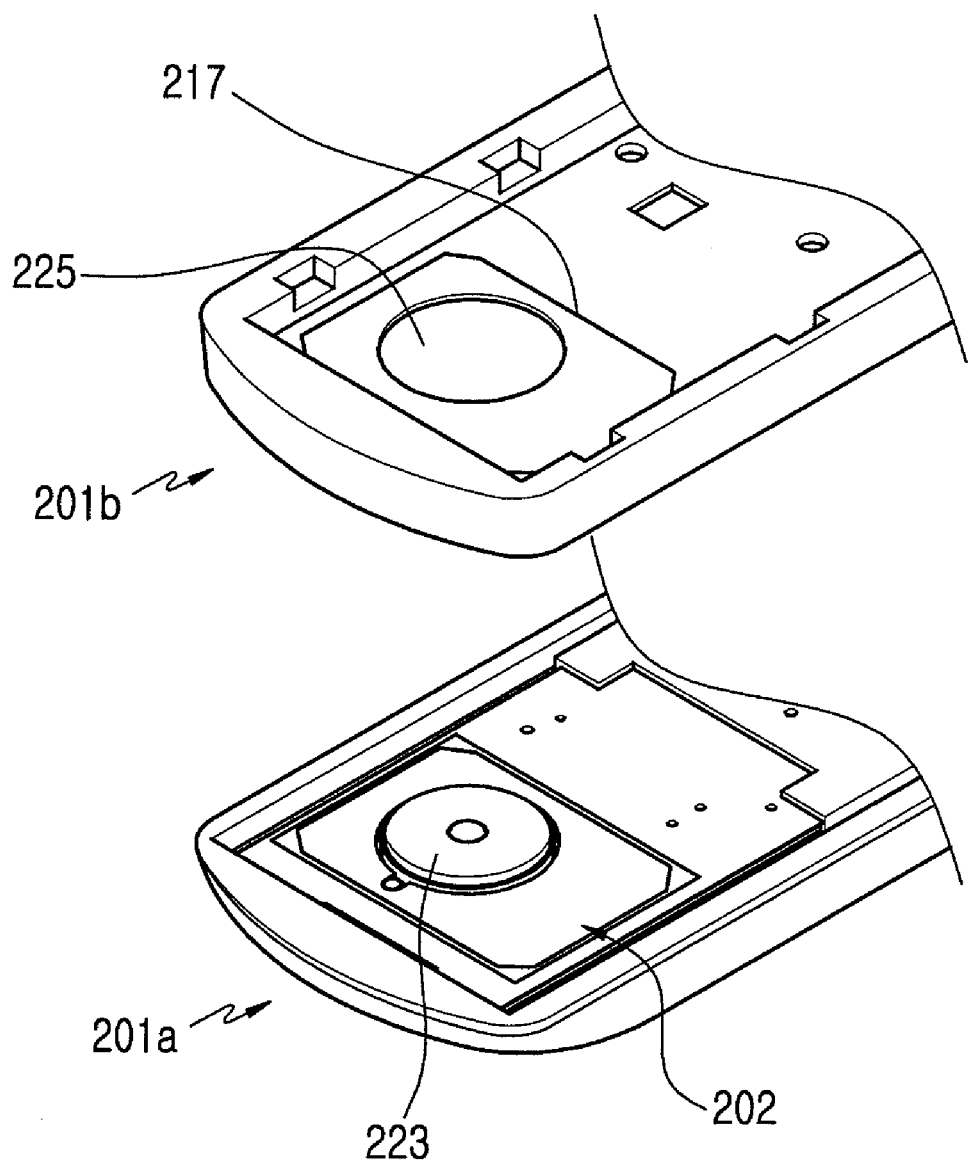
FIG. 3 is an exploded perspective view of the portable terminal shown in FIG. 2.
Figure 4:
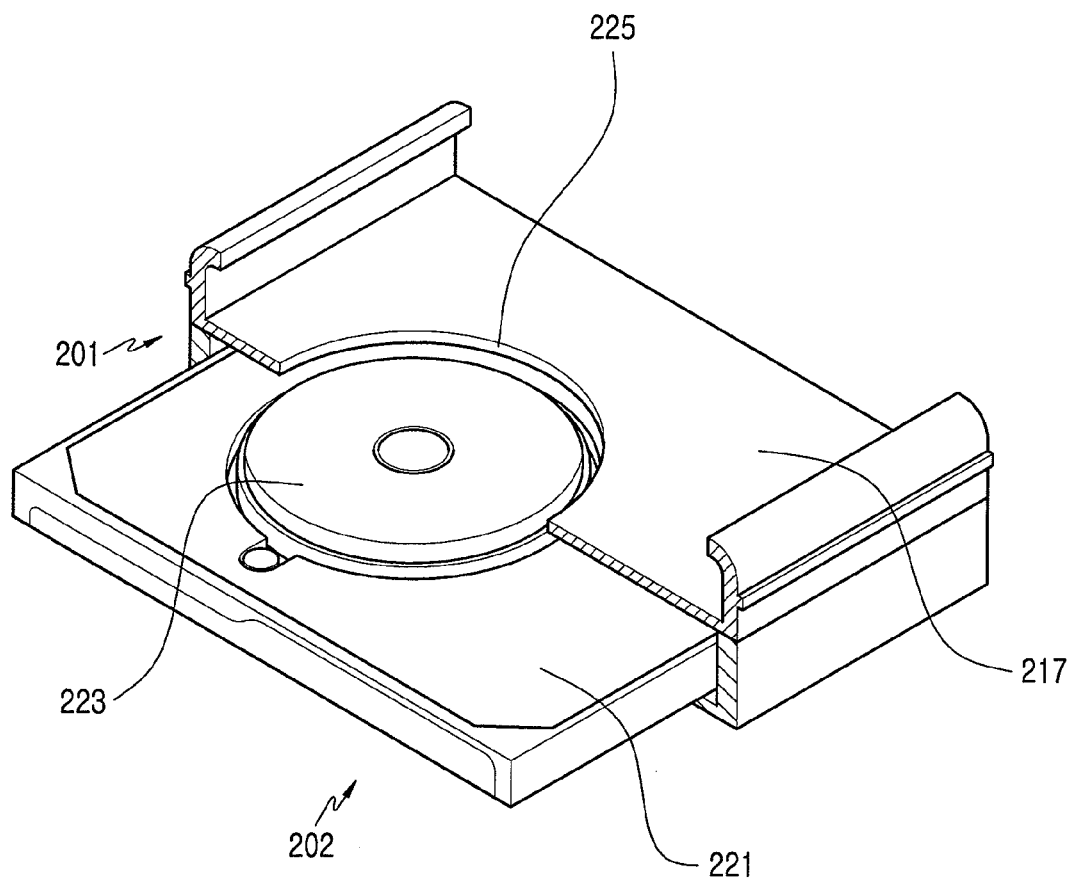
FIG. 4 is a partially broken perspective view of the portable terminal shown in FIG. 2.

FIG. 2 is a sectional view of a portable terminal 200 having a hard disk 202 according to an exemplary embodiment of the present invention. FIG. 3 is an exploded perspective view of the portable terminal 200 shown in FIG. 2. FIG. 4 is a partially broken perspective view of the portable terminal 200 shown in FIG. 2. As shown in FIGS. 2 to 4, the portable terminal 200 having a hard disk 202 according to an exemplary embodiment of the present invention has an opening 225 formed on a housing 201 so as to receive a motor 223 of the hard disk 202 therein.

The housing 201 of the terminal 200 includes a front case 201a and a rear case 201b, and the hard disk 202 is received inside the housing 201. The rear case 201b has a battery mounting recess 217 formed thereon in order to mount a battery pack (not shown) of the terminal 200, and the opening 225 extends from the battery mounting recess 217 to an inner part of the housing 201. That is, the opening 225 connects the battery mounting recess 217 to the inner part of the housing 201.

The motor 223 is received inside the opening 225 while protruding about 1.06 mm from one surface of the body 221 of the hard disk 202 so that no extra space is unnecessarily occupied in the housing 201. The opening 225 has the shape of a circle having a diameter at least about 1 mm larger than that of the motor 223 so as to prevent the outer peripheral surface of the motor 223 from interfering with the boundary of the opening 225.

When the hard disk 202 is installed with the motor 223 received inside the opening 225, the motor 223 has a height difference s3 of about 0.84 mm relative to the outer peripheral surface of the housing 223. Considering that the battery mounting recess 217 has the opening 225 formed thereon according to an exemplary embodiment of the present embodiment, the motor 223 can maintain a distance of about 0.84 mm from a battery pack mounted in the battery mounting recess 217.

Meanwhile, as long as the portable terminal according to an exemplary embodiment of the present embodiment has a space of a height s4 of about 5.75 mm secured to install the hard disk 202 in the same manner as the conventional portable terminal, one and the other surfaces of the body 221 of the hard disk 202 can maintain distances s1, s2 of about 1 mm from the inner peripheral surface of the housing 201, respectively. Similarly, although a shield member 219 is installed inside the housing 201 with a space of the same height secured to install the hard disk 202, the other surface of the body 221 of the hard disk 202 facing the shield member 219 still can maintain a distance of about 1 mm from the shield member 219.

When a distance of about 1 mm is determined between one surface of the body 221 of the hard disk 202 and the inner peripheral surface of the housing 201, and between the other surface of the body 221 of the hard disk 202 and the inner peripheral surface of the housing 201 or the shield member 219, respectively, the motor 223 has a height difference of about 0.84 mm relative to the outer peripheral surface of the housing 201.

As long as the distance of no more than about 0.5 mm is maintained between both surfaces of the hard disk 202 and the inner peripheral surface of the housing 201 in the same manner as the conventional portable terminal, the height of the space for installing the hard disk 202 can be about 1 mm smaller than that of the conventional portable terminal. That is, as long as the same distance is maintained between both surfaces of the body 221 of the hard disk 202 and the inner peripheral surface of the housing 201 as the prior art, the height of the space for installing the hard disk 202 is about 4.75 mm.

Since the distance between both surfaces of the body of the hard disk 202 and the housing 201 can have a value between about 0.5 mm and about 1 mm, not only can the distance between both surfaces of the body of the hard disk 202 and the housing 201 be larger than that of the conventional structure, but also the height of the space for installing the hard disk 202 can be reduced.

For example, when the distance between both surfaces of the body 221 of the hard disk and the housing 201 is about 0.7 mm, an additional distance of about 0.2 mm is secured, and the space for installing the hard disk 202 is reduced by about 0.6 mm.

In summary, the portable terminal according to an exemplary embodiment of the present invention has an opening formed on the housing so as to receive the motor of the hard disk. If the motor of the hard disk is received inside the opening of the terminal having the same space secured to install the hard disk according to an exemplary embodiment of the present invention, the distance between the body of the hard disk and the inner peripheral surface of the housing of the terminal is sufficiently secured so as to prevent external impact from directly acting on the hard disk. In addition, as long as the same distance is secured between the body of the hard disk and the inner peripheral surface of the housing of the terminal, the motor of the hard disk is received inside the opening so that no extra space is unnecessarily occupied inside the housing. This is advantageous for the compactness of the terminal.

Although the disclosed terminal according to exemplary embodiments of the present invention has an opening formed on its housing, the opening may be formed on the main board of the terminal to receive the motor 223, as long as the hard disk 202 directly faces the main board (e.g. PCB) of the terminal.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A portable terminal comprising:
   a housing having an opening formed therein;
   a hard disk located on a first side of the opening and having a motor which protrudes from a body of the hard disk to be received in the opening; and
   a battery mounting recess formed in the housing on a second side of the opening, the opening extending from the battery mounting recess through the housing.

2. The portable terminal as claimed in claim 1, further comprising a shield member installed inside the housing of the terminal, at least one surface of the hard disk facing the shield member while maintaining a distance of at least about 0.5 mm from the shield member.

3. The portable terminal as claimed in claim 1, wherein both surfaces of the hard disk maintain a distance of at least about 0.5 mm from an inner peripheral surface of the housing of the terminal, respectively.

4. The portable terminal as claimed in claim 1, wherein the motor maintains a height difference of at least about 0.84 mm relative to an outer peripheral surface of the housing of the terminal.

5. The portable terminal as claimed in claim 1, wherein the opening comprises a diameter at least about 1 mm larger than a diameter of the motor.

* * * * *